United States Patent [19]

Brown de Colstoun et al.

[11] Patent Number: 4,567,367

[45] Date of Patent: Jan. 28, 1986

[54] METHOD FOR DETECTING A SOURCE OF HEAT, MORE PARTICULARLY A FOREST FIRE IN A WATCHED AREA, AND SYSTEM FOR CARRYING OUT SAID METHOD

[76] Inventors: Francois P. D. Brown de Colstoun, 3 rue Joseph Bernard, 92100 Boulogne-Billancourt; Jean-Paul Chambaret, 161 Ave. Paul-Vaillant Couturier, 94250 Gentilly; Yves Chambaret, 77 Ave. Parmentier, 75011 Paris; Arnaud G. Le Saige de la Villesbrunne, 4 Blvd. du Roi, 78000 Versailles; Jean-Claude M. Moscovici, 68 rue de Bourgogne, 75005 Paris; Michel Moscovici, 176 rue Théodore Honoré 94130 Nogent sur Marne, all of, France

[21] Appl. No.: 570,198

[22] Filed: Jan. 12, 1984

[30] Foreign Application Priority Data

Jan. 13, 1983 [FR] France ................................ 83 00461

[51] Int. Cl.$^4$ ......................... G01J 1/00; G08B 26/00; G08B 17/12

[52] U.S. Cl. .................................... 250/340; 250/347; 340/505; 340/578

[58] Field of Search .................... 350/6.1, 6.4, 6.5, 6.6, 350/6.7, 6.8, 6.91, 577, 578, 579, 580; 250/347, 236, 340, 342; 358/206, 207, 208; 340/505, 578

[56] References Cited

U.S. PATENT DOCUMENTS

| | | | |
|---|---|---|---|
| 1,959,702 | 5/1934 | Barker | 250/342 |
| 3,475,608 | 10/1969 | Pardes | 250/83.3 |
| 3,493,953 | 2/1970 | Taylor | 340/228 |
| 3,941,923 | 3/1976 | Wheeler | 358/206 |
| 3,987,445 | 10/1976 | Fales, III | 340/601 |

FOREIGN PATENT DOCUMENTS

| | | |
|---|---|---|
| 2224818 | 10/1974 | France . |
| 1127443 | 9/1968 | United Kingdom . |

*Primary Examiner*—Alfred E. Smith
*Attorney, Agent, or Firm*—Steinberg & Raskin

[57] ABSTRACT

The invention relates to a system for detecting sources of heat, comprising a certain number of watching stations distributed within the area to be watched, comprising an infrared radiation detector located at a level above the area to be watched and connected to a motor for imparting to the detector a periodic angular, step-by-step motion, and a device for logic processing of the information received by the detector and for transmission through the telephone link, a central station being equipped with a data processing device including a memory in which the known sources of heat of the area to be watched are recorded or entered.

19 Claims, 9 Drawing Figures

FIG. 7
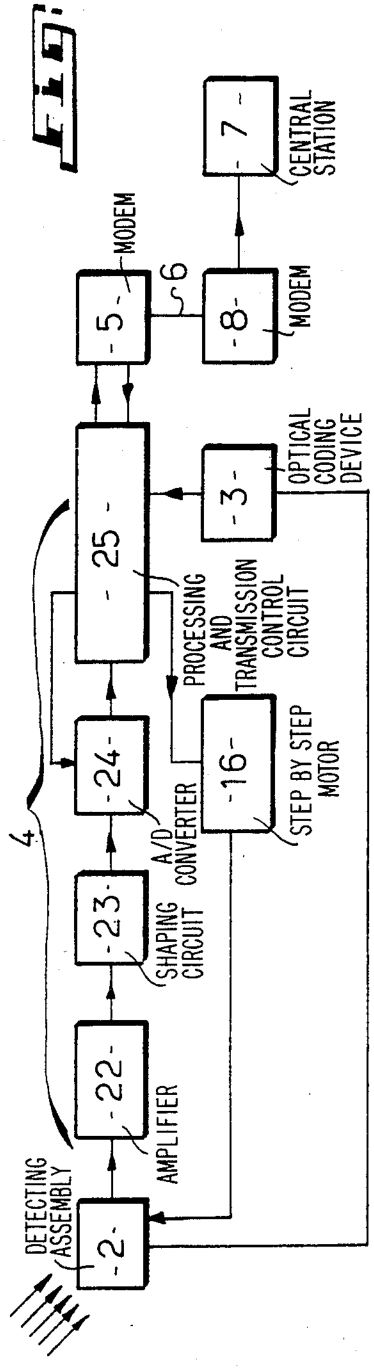
FIG. 8
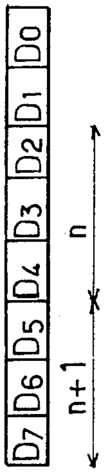
FIG. 9
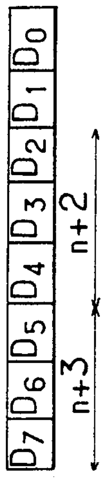
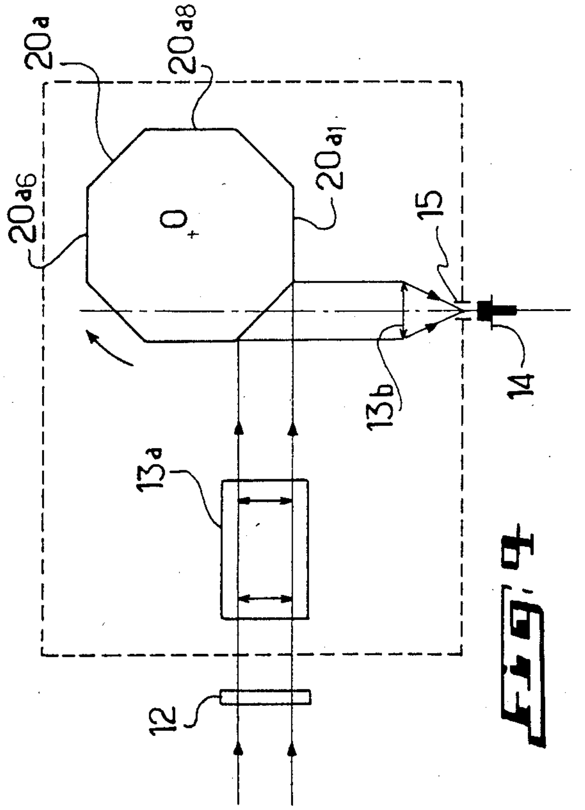
FIG. 4

METHOD FOR DETECTING A SOURCE OF HEAT, MORE PARTICULARLY A FOREST FIRE IN A WATCHED AREA, AND SYSTEM FOR CARRYING OUT SAID METHOD

BACKGROUND OF THE INVENTION

The present invention has for a subject matter a method for detecting a source of heat which may occur in a predetermined area, zone or space, possibly of great extent, particularly a fire in a forest, and a system for carrying out the said method.

The method and system used nowadays to this end, more particularly for detecting a forest fire, may be summed up as follows.

When the weather conditions are propitious to the outbreak or spread of fires, the forest area concerned is placed under watch. A certain number of observation towers or stations of relatively great height are distributed within the area. At the top of each tower, a fireman scrutinizes the horizon in order to visually detect a column of smoke whose localization is not entered on a watcher list which is in the watchman's possession and indicating the existence of a fire. If he discovers such a fire, he will warn the forest fire brigade center through a telephone link. At this center, the identified direction is marked and, after the reception of a call from a nearby tower, the location of the marked fire is performed by way of triangulation. For pointing accuracy considerations, the intervention of a third tower is necessary or at least desirable. It is seen that this watching method and device suffer particularly from the following major drawbacks:

- watching limited in time (in daytime and depending on the weather conditions - fog);
- difficulty of regular systematic observation along the whole horizon, due to the human factor;
- problem of pointing accuracy;
- difficulty of observation of the importance and nature of the fire;
- necessity for human selection between authorized smoke and fire;
- absence of indication as to the direction of spread of the fire;
- necessity for awaiting at least a second piece of information from another tower;
- turnover of considerable personnel.

SUMMARY OF THE INVENTION

The present invention has as its purpose to provide a method and a system for detecting a source of heat, more particularly a fire, which does not suffer from the above mentioned drawbacks inherent in the known method and system.

The invention therefore relates to a method for detecting sources of heat, more particularly fires in forests or the like, within an area, zone or space, more particularly of great extent, according to which said area is placed under watch from at least two watching stations, the information relating to a detected source of heat is transmitted to a central station through a transmission link such as a telephone link, and in this central station is located the source of heat according to the information received from the watching stations, said method being characterized in that the said area is watched by means of an infrared radiation detector at each watching station, said detector is caused to periodically and preferably permanently accomplish angular movements for scanning the area to be watched, the information relating to all the sources of heat detected is transmitted to the central station, and there is performed a comparison of the information received from the detector with the information previously stored in this station, relating to known sources of heat and not to be taken into account, in order to determine the newly born sources of heat.

According to an advantageous feature of the invention, the detector is displaced in a step-by-step manner and the information received by the detector during each corresponding period of stoppage is transmitted to the central station.

According to still another feature of the invention, the detector is caused to accomplish a vertical scanning motion during each period of stoppage, about a horizontal axis, the scanning being advantageously performed at a high frequency.

According to the method of the invention, there is transmitted to the said central state an, in digital form, the information relating to the intensity of infrared radiation received during the period of stoppage after each step or after several steps, said information is stored at the central station and returned to the detecting device in which the information received from the center is compared with the information initially transmitted to the latter, and there is indicated to the central station, together with the following information, if appropriate, by a bit of 0 or 1 value, whether there was an equivalence between the information compared, and the information stored at the central station is invalidated in case of a difference.

According to another advantageous feature of the invention, there is transmitted with each information relating to the intensity of the infrared radiation, data such as a synchronizing bit which is used at the central station to synchronize the attribution to the said received information, relating to the radiation, of the information relating to the corresponding angular position of the detector.

The system for carrying out the method according to the present invention is characterized in that it comprises a certain number of watching stations distributed within the area or zone to be watched, comprising an infrared radiation detector placed at a level above the area to be watched and connected to a motor for imparting to the detector a periodic angular, step-by-step motion, and a device for logic processing of the information received by the detector and for transmission through the telephone link, and in that the central station is equipped with a data processing device comprising a memory in which are recorded or entered the sources of heat known in the area to be watched.

According to an advantageous feature of the system, the detector is provided with a means allowing a vertical scanning during each angular position corresponding to a step of the detector.

According to still another advantageous feature, the vertical scanning means is constituted by a mirror vibrating at a high frequency.

BRIEF DESCRIPTION OF THE DRAWINGS

For a fuller understanding of the invention, reference is made to the following description, taken in connection with the accompanying drawings, in which:

FIG. 4 shows diagrammatically and to a larger scale another form of embodiment of the detector unit illustrated in FIG. 1;

FIG. 7 illustrates the structural and operating principle of the system of the present invention, in the form of a block diagram; and FIGS. 8 and 9 illustrate diagrammatically the structure of the octets transmitted to the central station.

DESCRIPTION OF THE PREFERRED EMBODIMENTS

The method and system of the present invention are particularly suitable for detecting sources of heat such as fires in forests of great extent. It is therefore desirable to describe the invention by considering, as an example of application, a forest watching system such as the one illustrated in FIG. 1. It should be noted, however, that the invention is by no means limited to such an application and can be used in all cases where it is desired to detect and locate in a predetermined area the appearance of an object or of a phenomenon, either moving or fixed, which emits infrared radiation.

Figure 1:
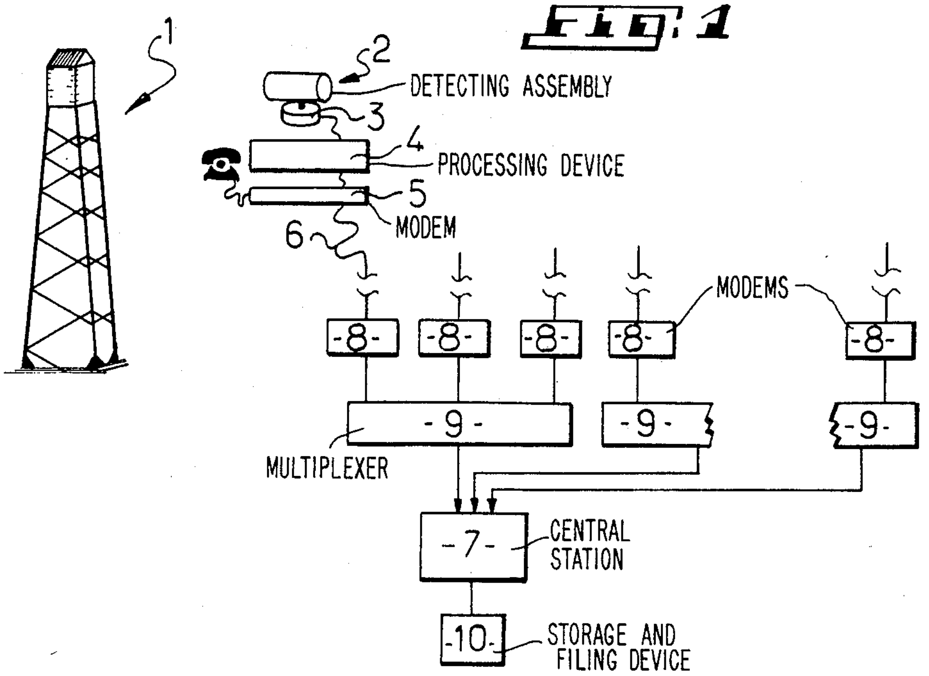
FIG. 1 is a block diagram of the system for detecting sources of heat according to the present invention.

The form of embodiment of the invention, illustrated in FIG. 1, for detecting forest fires, comprises a certain number of watching towers, only one of which is shown. Such towers have sufficient height and are placed in a suitable manner so that their top is located at a level above the possible seats of fire to be detected in the watched forest area.

At the top of the towers 1 is installed an equipment comprising particularly an infrared radiation sensing-detecting assembly 2 rotatable about a substantially vertical axis so as to be capable of accomplishing a horizontal scanning motion, an optical coding device 3 associated with said assembly and intended to determine the angular positions of the latter, a device 4 for processing the signals produced by the detector and representing the intensity of the sensed infrared radiation, as well as a modem 5 connected to a telephone line 6 and intended to adapt the electric signals to the properties of the telephone line.

The telephone lines such as the line 6 connect the watching stations at the top of towers 1 to a central station 7, which may advantageously comprise a computer, through the medium of modems 8 and of eight-channel multiplexers 9, each associated with 8 modems. The reference numeral 10 designates a storage and filing device associated with the central station 7.

It should be noted that the connection by a telephone line of the central station to the various watching stations may be replaced by any other means of communication. Of course, the type of connection should be selected according to the infra-structure already installed or likely to be installed, easily and economically.

Figure 2:
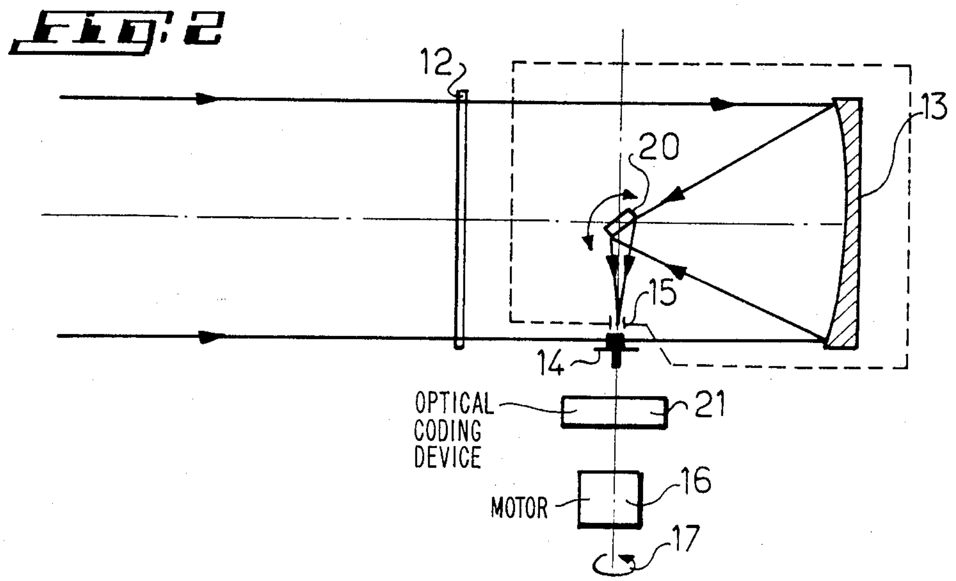
FIG. 2 shows diagrammatically and to a larger scale the detector unit illustrated in FIG. 1.
Figure 3:
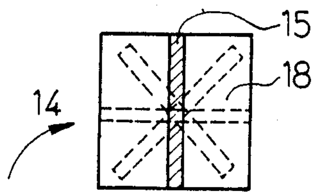
FIG. 3 is a top view of the detector illustrated in FIG. 2.
Figure 6:
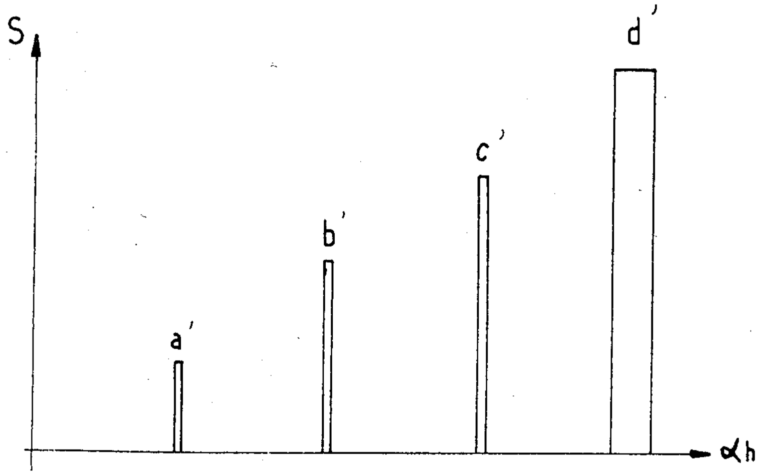
FIGS. 5 and 6 show the output signal produced by the detector before and after a shaping operation, respectively, depending on the angular position of the detector.

Referring to FIGS. 2 and 3, there will now be described in more detail the infrared radiation sensing-detecting assembly 2.

The assembly 2 comprises an optical radiationcollecting device provided with an infrared filter 12, a spherical collecting mirror 13 and the detector proper 14 which is provided with an slit 15 of rectangular shape as seen in FIG. 3. The assembly surrounded in FIG. 2 with an interrupted line is rotatable about a vertical axis centered on the center of the slit 15 and on the detector fixedly located below. This assembly is driven in rotation by a step-by-step motor 16 in the direction of rotation indicated at 17 so as to be capable of accomplishing the horizontal scanning motion. The slit 15 pertaining to the rotatable assembly is shown in dotted lines in several angular positions about the stationary sensitive surface 18 of the detector 14.

To allow vertical scanning, the vibrating mirror 20 is arranged in the rotatable assembly in the focal region of the collecting mirror 13 so as to displace the image of the detector in the image focal plane of the said mirror, or, otherwise stated, so as to form on the stationary detector 14 the image of a portion of the vertical field. Said mirror vibrates at a relatively high frequency for reasons which will be explained later.

At 3 is seen optical coding device intended to define the angular position of the rotatable assembly during the scanning of the horizontal field.

Before explaining the operation of the system and the different steps of the method of detecting a fire, including a specific processing of the signals produced by the detector, a few considerations will be set forth hereafter which will allow understanding according to what criteria the detector and the optical and mechanical device as well as a signal processing device may be advantageously selected. The object of the system of the present invention, given solely by way of example, is to detect forest fires at distances which may reach 20 kilometers. It is essential that the information, i.e. the radiation emitted by a fire, be transmitted to the detector with a minimum absorption. Taking into account the absorption spectrum of the atmosphere of the infrared radiation, it is found that there exists a certain number of spectral bands or windows which are particularly transparent to this radiation. Within the scope of the invention, the window is taken to be the wavelength range from 3 to 5.5 microns. Within this range, the atmospheric transmission is good and the spurious radiation such as for example the solar radiation is limited. This window has proved advantageous for optimum day-and-night watching, i.e., even in broad daylight. The detectors which are efficient in this wavelength range are, for example, PbSe detectors cooled to minus 45° C. It should be noted, however, that the choice of the infrared radiation detector depends upon the specific conditions and criteria in each case of application.

Within the scope of the invention, assuming, for example, that it is desired to obtain a spatial resolution which is of the order of 15 meters at a distance of 20 kilometers, it is therefore necessary to detect, with an accuracy within 15 meters, a seat of fire at a distance of 20 kilometers. Now, at a distance of 20 kilometers, a segment of 15 meters is seen at an angle $2\alpha_h = 15/(2\times10^4)$ rad $= 7.7\times10^{-4}$ radians. The number of elementary sectors resolved per revolution will therefore be $(2\pi/2\alpha_h) = 8192$ sectors $= 2^{13}$.

The optical coding device provided for the definition of the angular positions of the rotatable optical system must therefore be capable of differentiating $2^{13}$ different directions per revolution.

For reasons connected with the maximum rate of transmission of the usual telephone lines and to the number of useful information units to be transmitted, the highest speed of analysis of the horizon will advantageously correspond to one revolution in 40 seconds. The time of analysis of a sector is therefore about 5 ms corresponding to a frequency of 200 cps. To obtain a good spatial resolution, it is desirable that the detector have a passband about 10 times greater, i.e. about 2 kcps.

Concerning the vertical observation field and particularly the vertical scanning frequency, the following should be borne in mind: if the observation towers have a height of 40 meters and if the higher limit of the vertical observation field is the horizontal direction, thus allowing direct observation of the sun to be avoided, except in the morning and in the evening, and taking as the lower limit a shadow region of 200 meters around the base of the tower, there is obtained a vertical field angle equal to $15\times10^{-2}$ rad. It should be noted that this shadow region is relative, because any outbreak of fire therein will immediately be detected because of the smoke which would pass through the observation area, at a very small distance from the detection system. In view of the lack of proportion between the vertical and horizontal field and of the requirement resulting therefrom as to the dimensions of the detector, it is desirable to associate with the detector a vibrating mirror 20. As mentioned earlier, this mirror advantageously vibrates at a sufficiently high frequency for the detector to "see" the whole vertical angular field at one and the same time. It is then desirable to choose a vibration frequency of the order of 20 kcps, i.e. 100 times higher than the frequency of analysis of a horizontal sector and 10 times higher than the upper limit of the passband of the detection system (2 kcps).

It should be noted, however, that the use of a vibrating mirror to perform a vertical scanning is not compulsory and can be avoided if the vertical field is sufficiently small or if the sensitie surface of the detector is sufficiently important. Besides, any other appropriate means may be used to solve the above-mentioned disproportion problems.

FIG. 4 illustrates another form of embodiment of the infrared radiation sensor-detector assembly 2. The latter comprises a radiation-collecting optical device provided with an infrared filter 12, with an objective device 13*a* and with the detector 14 provides with the slit 15. As in the other form of embodiment illustrated in FIGS. 2 and 3, the assembly surrounded in FIG. 4 with an interrupted line is rotatable about a vertical axis centered on the center of the slit 15 and on the detector 14 fixedly located below. This assembly is driven in rotation in the same manner as that of FIG. 2 so that the driving means 16 has been omitted in FIG. 4. To allow scanning the vertical field, a mirror 20*a* rotatable clockwise is arranged in the rotatable assembly in the focal region of the objective 13*a* so as to form on the fixed detector 14 the image of a portion of the vertical field. The mirror 20*a* has several reflecting surfaces $20_{a1-20a8}$ arranged for example octagonally and focusses the infrared radiation onto the detector 14 through the convergent lens 13*b* located above the detector 14 and the slit 15. The mirror rotates about the axis extending through the center 0 of the octagon and perpendicular to the axis in dot and dash lines extending through the centers of the lens 13*b* of the slit 15 and of the detector 14. The angular rotary speed of the mirror 20*a* must be so selected as to be sufficiently high to allow the detector to "see" the whole of the vertical angular field at one and the same time. This speed may be selected in accordance with the frequency of vibration of the mirror 20 defined previously.

The method and the operation of the system of the invention, which has just been described, is inferred from the description of the operation which will be made hereafter with reference to FIGS. 5 to 9. The detector 2 emits an electric signal directly proportional to the intensity of the infrared radiation received. This signal is transmitted to the processing device 4 in which it is amplified at 22, shaped at 23, converted at 24 into digital form by an analog-digital convertor and processed in a circuit for logic processing and for transmission control 25, before reaching the modem 5, as appears from FIG. 8.

Figure 5:
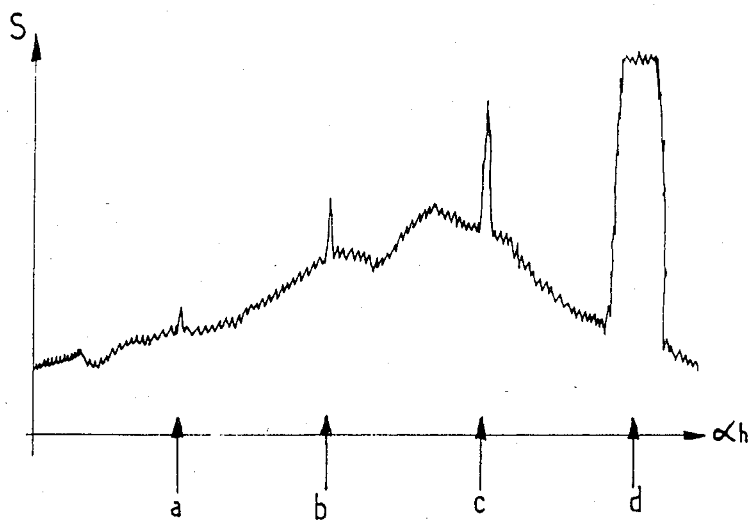

By way of example, FIG. 5 shows the electric output signal of the detector 2 depending on the angular position $\alpha_h$ of the rotatable optical assembly of the detector, during the scanning of the horizontal field. This signal displays at a, b and c, peaks which are representative of a fire of 5 meters at 20 kilometers, of 5 meters at 15 kilometers and of 5 meters at 5 kilometers, respectively.

The abrupt rise at d of the level of the output signal is caused by the sun. The distinction between the sources of heat to be located, as the seats of fire a, b and c, of the source of heat d, and also others, will take place at the central station in a manner which will be described later. Considering the peaks representative of a fire, in FIG. 5, it is seen that these peaks are less characterized by their amplitude with respect to the spurious background, which amplitude may be relatively small as in the case of the peak a, than by the shape of these peaks which is characterized by very steep leading and trailing edges, i.e. by very short rise times.

By taking advantage of this particularity, there are obtained at the output of the shaping circuit 23, pulses a', b', c' and d' (FIG. 6) which correspond to the peaks a, b, c, and d. The analog-digital converter 24 converts each pulse containing the information on the intensity of an infrared radiation emitted by the source of heat into an 8-bit digital signal.

The logic processing and transmission control circuit 25 receives for each source of heat the digital signal relating to the intensity of the radiation and the corresponding information relating to the angular position of the rotatable optical assembly, which has been generated by the optical coding device 3 in the form of a 13-bit digital signal; if each angular position corresponds to an angular segment of $2\alpha_h=7.7\times10^{-4}$ radians as in the example considered. The circuit 25 first sequences the signals so that they are transmissible by the modem 5. Since the modem accepts only signals of 8 bits in series, the circuit 25 combines the two data, of 13 parallel bits and of 8 parallel bits, respectively, into an information of 8-bits in series. FIGS. 8 and 9 illustrate the structure of the octet or 8-bit byte data transmitted by the modem 5 to the central station 7 (FIG. 1). Consequently, it is advisable that the circuit 25 effect a data compression. This consists, in the first place, in not transmitting the 13-bits of angular position. In the series of 8 bits transmitted to the modem 5, use is made of one bit for position location. This is a synchronizing bit which always is in the low logic state 0, except at the moment of passage through the digital angular position 0000000000000 where the synchronizing signal is at the high logic level 1. This bit allows reconstituting the information relating to the angular position at the central station. The latter comprises to this end a 13-bit counter which is reset to zero by the synchronizing bit and which is incremented by one step upon each further transmission of an octet. As regards the radiation intensity level data, the 8-bit accuracy is not necessary and a 3-bit accuracy is considered satisfactory. There can therefore be transmitted by means of an 8 bit byte the information relating to two angular positions of the sensing device of the detector, constituted by the rotatable optical assembly. The 13-bit counter of the central station, 7 i.e. of the computer, is therefore incremented by two steps upon each further transmission of an 8-bit byte. The remaining bit of the 8-bit byte is used to indicate the correct operation of all the systems installed on the tower 2. FIGS. 8 and 9 show two 8-bit byte transmitted successively. The configuration of each 8-bit byte represented is characterized by a synchronizing bit $D_0$, an error bit $D_1$, three bits $D_2$ to $D_4$ of radiation intensity data relating to an angular position n (FIG. 8) or n+2 (FIG. 9) and three intensity data bits $D_5$ to $D_7$ respecting the following angular position n+1 (FIG. 8) or n+3 (FIG. 9).

Each 8-bit byte thus formed is transmitted to the modem 5 which sends it to the modem 8 through the permanent telephone line 6. The 8-bit byte output of the modem 8 which is called start octet is stored in the computer of the central station 7. It is thereafter reinjected by the computer into the modem 8 which retransmits it to the modem 5, which is referred to as return octet after which it reaches the processing circuit 25. The latter then compares the start octet with the return octet. If the two octets are equivalent, this means that the transmission has taken place correctly and the computer has stored correct data. If the two 8-bit byte are different, it is inferred that there has occurred an error in the transmission and the computer has stored incorrect data. Once the comparison between the two 8-bit byte has been accomplished, the logic processing and transmission control module 25 acts upon the control means of the step-by-step motor 16 driving the sensing device constituted by the rotatable optical assembly of the detector 2. If the sensing device, during the comparison, was in the n+1 position, the motor now places the sensing device in the n+2 position. The sensing device produces a further output signal which will be processed by the shaping circuit 23, after being amplified at 22, and applied to the analog-digital converter 24. The circuit 25 then starts the analog-digital conversion and stores the radiation intensity 8-bit byte relating to the n+2 position. Thereafter, the circuit 25 again acts upon the control means for the rotation of the motor 16 to place the sensing device in the n+3 position. It starts a further analog-to-digital conversion, whereafter, according to the newly recorded data, transmits to the modem 5 the n+2, n+3 8 bit byte according to FIG. 9. This 8 bit byte contains in the $D_1$ bit the information relating to the comparison of the previously transmitted 8-bit byte containing the information relating to the angular positions n and n+1 (FIG. 8). If the previous comparison operation has found an error in the transmission, the error bit of the new 8-bit byte is in the high logic state 1, thus resulting inthe invalidation of the 8-bit byte octet (n, n+1) previously recorded by the central station.

The operations just described allow permanently checking the correct operation of the system. There will be described hereafter the important operation which allows detecting a fire of other sources of heat, which must not start an alarm signal. Indeed, other sources of heat might cause the production of signals similar to the peaks indicative of a fire, which have been illustrated in FIG. 5. For example, an abrupt variation of the signal level d, which is generated by the sun (sunrise or sunset) and transmitted to the circuit 25 in the form of the pulse d' is transmitted to the central station 7. Likewise, central station 7 would be informed of smokes from dwelling places, and in certain cases motor-cars, trains, planes, etc. usually located or passing through the area watched by the detector 2.

To preclude an unjustified alarm signal, there are entered in the list kept at the central station 7 the spurious sources of heat which must not be taken into account. To this end, the computer of the central station is provided with a memory in which are recorded the information relating to sources. To determine whether a source of heat detected by detector 2 is a fire, the central station, on receipt of each 8 bit-byte and after having associated with the information received the information relating to the angular position of the sensing device of the detector, by means of its 13-bit counter and the synchronizing bit $D_0$ contained in the 8 bit-byte received, performs a comparison with the content of its memory.

It is thus easy to discriminate a fire of a fixed spurious heat source. To also allow discriminating a fire of a moving or passing spurious heat source, such as a motor-car or a train, the fact that this source is moving may serve as a criterion for such discrimination. An appropriate programming of the computer of the central station thus allows it to detect a fire even in the presence of moving spurious heat sources.

It appears from the description of the system of the invention which has just been made that the central station 7, or more exactly the computer, permanently receives a flow of information from the various watching stations, each equipped with an infrared radiation detector. If a source of heat proves to be a fire, the latter will be easily located from its very outbreak and steps may be taken immediately to extinguish this starting fire.

Of course, the invention is by no means limited to the detection of fires. More generally, the invention may be used to detect the appearance or introduction into a watched area of any object or phenomenon giving rise to the emission of an infrared radiation. The invention may thus serve to watch for example a frontier.

It should be added that the information relating to the nature of the detector, to the mode of checking the correct operation of the system and to the configuration of the messages in digital form may be different without departing from the scope of the invention.

There may also be contemplated to impart to the radiation sensing device a step-by-step vertical-scanning motion to transmit to the central station information relating to the position in the vertical field. The location of the source of radiation could thus be determined from the data relating to the positions in the horizontal and vertical fields.

What is claimed is:

1. A method for detecting sources of heat, more particularly forest fires in an area particularly of great extent, according to which said area is watched from at least one watching station having an infra-red detector detecting an infra-red radiation emitted by each source of heat and a device connected to the detector for processing and transmitting an information relating to the intensity of the received infra-red radiation of a detected source of heat; the information relating to the detected source of heat being transmitted to a central station through a transmission link, such as a telephone link; and the location of said source of heat being determined at said central station in accordance with the information received from the watching station, said infra-red detector being caused to accomplish, periodically and preferably permanently, angular movements for scanning the area to be watched; said method comprising the steps of:

transmitting to the central station through the transmission links the information relating to all the sources of heat detected by the infra-red detectors;

previously storing at the central station information relating to known sources of heat not to be taken into account;

automatically comparing at the central station each information received from all the infra-red detectors to the information previously stored at the central station;

determining the newly born sources of heat from the results of the comparison; and emitting an alarm signal when at least one newly born source of heat is determined.

2. A method according to claim 1, wherein said detector is displaced step-by-step and transmits to the central station through the processing and transmission device the information which the detector received during each corresponding period of stoppage.

3. A method according to claim 2, wherein the detector is caused to perform a horizontal scanning motion.

4. A method according to claim 2, further comprising the steps of transmitting in a digital form the information, relating to the intensity of the infra-red radiation received during each period of stoppage of the detector, to the central station; storing the information at the central station; returning the information to the processing and transmission device; comparing at the processing and transmission device the information received from the central station to the information initially transmitted to the latter; indicating in the following information to be transmitted, by a bit value, whether there was an equivalence between the information compared; and invalidating the information stored at the central station in the case of a difference between the information.

5. A method according to claim 4, further comprising the steps of transmitting with each information relating to the intensity of the infrared radiation, data such as a synchronizing bit, and using this bit at the central station to ensure the attribution to said received information relating to the infra red radiation, of the information relating to the corresponding angular position of the detector.

6. A method according to claim 5, wherein the information relating to the intensity of the infrared radiation received is transmitted in the form of an octet containing a checking bit $D_0$ and a synchronizing bit $D_1$.

7. A method according to claim 6, wherein each octet comprises the information relating to the infrared radiation received corresponding to two angular positions of the detector.

8. A method according to claim 1, wherein the detector is caused to perform a vertical scanning motion.

9. A method according to claim 1, further comprising the steps of detecting the nature of a source of heat detected by taking into account the properties of such source, such as heat evolution or displacement within the watched area.

10. A system for detecting sources of heat, more particularly forest fires in an area particularly of great extent, comprising a plurality of watching stations distributed within the area to be watched; a central station connected to each watching station with a transmission link, such as a telephone link, each watching station including an infra-red detector for detecting the infra-red radiation emitted by each source of heat and a device connected to the infra-red detector for processing information relating to the intensity of the received infra-red radiation of a detected source of heat and transmitting the information to said central station through said transmission link; the location of the source of heat being determined at said central station in accordance with the information received from said watching stations and said infra-red detector being connected to a motor for imparting thereto periodically and preferably permanently, angular movements for scanning the area to be watched; wherein said processing and transmission device transmits to said control station through said transmission link the information relating to all the sources of heat detected by the infra-red detectors; said central station comprising a data-processing device, such as a computer device, including a memory in which are previously stored information relating to known sources of heat of the area to be watched and not to be taken into account; said data-processing device being adapted to automatically compare each information received from all said detectors to the information previously stored in said memory, and to determine the newly born sources of heat from the results of the comparison.

11. A system according to claim 10, wherein an optomechanical device is associated with said detector and is provided with an optical coding device which delivers a digital signal defining the angular position of said detector, said optical coding device being connected to the information processing and transmission device.

12. A system according to claim 11, wherein the detector is provided with a means allowing a vertical scanning in each angular position of the detector of a horizontal scanning.

13. A system according to claim 12, wherein the vertical scanning means consists of a mirror vibrating at a high frequency.

14. A system according to claim 13, wherein the detector is provided with a rectangular aperture, an optical device being mounted upstream of said aperture, which comprises a mirror collecting the received infra-red radiation, in the focal region of which is arranged the vertical-scanning vibrating mirror, the aperture, the vibrating mirror and the collecting mirror constituting a rotatable assembly, a fixed detecting member being placed below the aperture.

15. A system according to claim 14, wherein said rectangular aperture is in the form of a slit, the smaller side of the aperture being parallel to the axis of rotation of the vibrating mirror.

16. A system according to claim 10, wherein the information processing and transmission device is connected to the motor driving the detector to cause the angular displacement of the latter according to a predetermined program.

17. A method for detecting sources of heat, more particularly forest fires in an area particularly of great extent, according to which the area is watched from at least one watching station having an infra-red detector for detecting the infra-red radiation emitted by each source of heat and a device connected to the infra-red detector for processing and transmitting information relating to the intensity of the received infra-red radiation of a detected source of heat; the information relating to the detected source of heat being transmitted to a central station through a transmission link, such as a telephone link; and the location of the source of heat being determined at said central station in accordance with the information received from the watching station, said infra-red detector being caused to accomplish, periodically and preferably permanently, angular movements for scanning the area to be watched; said method comprising the steps of:

displacing, step-by-step, each infra-red detector;

transmitting in digital form to the control station through the transmission links, the information relating to all the sources of heat detected by the infra-red detectors during each corresponding period of stoppage of each detector;

previously storing at the central station information relating to known sources of heat not to be taken into account;

automatically comparing at the control station each digital information received from all the infra-red detectors to the information previously stored at the central station;

determining the newly born sources of heat from the results of the comparison;

emitting an alarm signal when at least one newly born source of that is determined; said method further comprising, in order to allow for continuously checking for correct execution, the steps of:

storing at the central station the digital information relating to the sources of heat;

returning the digital information to the processing and transmission device;

comparing at the processing and transmission device the digital information received from the central station to the digital information initially transmitted to the latter;

indicating in a following information to be transmitted, by a bit value, whether there is an equivalence between the digital information compared; and invalidating the digital information stored at the central station in the case of a difference between the information.

18. A method for detecting sources of heat, more particularly forest fires in an area particularly of great extent, according to which said area is watched from at least one watching station having an infra-red detector detecting the infra-red radiation emitted by each source of heat and a device connected to the infra-red detector for processing and transmitting information relating to the intensity of the received infra-red radiation of a detected source of heat; the information relating to the detected source of heat being transmitted to a central station to a transmission link, such as a telephone link; and the location of said source of heat being determined at said central station in accordance with the information received from the watching station, said detector being caused to accomplish, periodically and preferably permanently, angular movements for scanning the area to be watched; said method comprising the steps of:

displacing, step-by-step, each detector;

transmitting in a digital form to the central station through the transmission links the information relating to all the sources of heat detected by the infra-red detectors during each corresponding period of stoppage of each detector;

storing at the central station said digital information;

returning the digital information to the processing and transmission device;

comparing at the processing and transmission device the digital information received from the central station to the digital information initially transmitted to he latter;

indicating in a following digital form information to be transmitted, by a bit value, whether there is an equivalence between the digital information compared;

invalidating the digital information stored at the central station in the case of a difference between the digital information;

previously storing at the central station information relating to known sources of heat not to be taken into account;

automatically comparing at the central station, if there is no difference between the compared digital information, each digital information received from all the infra-red detectors to the information previously stored at the central station;

determining the newly born sources of heat from the results of the comparison; and emitting an alarm signal when at least one newly born source of heat is determined.

19. A system for detecting sources of heat, more particularly forest fires, in an area particularly of a great extent, comprising a plurality of watching stations distributed within the area to be watched; a central station connected to each watching station with a transmission link, such as a telephone link, each watching station including an infra-red radiation detector detecting the infra-red radiation emitted by each source of heat and a device connected to the detector for processing an information relating to the intensity of the received infra-red radiation of a detected source of heat and transmitting said information to the central station through said transmission link; the location of said source of heat being determined at said central station in accordance with the information received from the watching station and said detector being connected to a motor imparting thereto periodically and preferably permanently angular movements for scanning the area to be watched; said system comprising an optomechanical device connected between said detector and said processing and transmission device and provided with an optical coding device which delivers to the processing and transmission device a digital information defining angular position of said detector, whose driving motor imparts thereto a stepby-step angular movement; said processing and transmission device thus transmitting to the central station through each transmission link information relating to the intensity of the infra red-radiation in digital form with said digital information of the detector angular position at each corresponding period of stoppage of the detector; and wherein said central station comprises a data-processing device, such as a computer device, including a memory in which are previously stored information relating to known sources of heat of the area to be watched and not to be taken into account; said computer device being adapted to automatically compare each digital information received from all the detectors to the information previously stored in said memory and to determine the newly born sources of heat from the results of the comparison.

* * * * *